United States Patent
Krans et al.

(10) Patent No.: US 11,355,002 B2
(45) Date of Patent: Jun. 7, 2022

(54) WAKE-UP ALARM METHOD

(71) Applicant: KONINKLIJKE PHILIPS N.V., Eindhoven (NL)

(72) Inventors: Jan Martijn Krans, Den Bosch (NL); Thomas Jacob Theodoor Hagebols, Helmond (NL); Arlette Van Wissen, Culemborg (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/391,571

(22) Filed: Aug. 2, 2021

(65) Prior Publication Data
US 2022/0044546 A1 Feb. 10, 2022

(30) Foreign Application Priority Data
Aug. 4, 2020 (EP) .................................... 20189423

(51) Int. Cl.
*G08B 25/00* (2006.01)
*G01J 1/42* (2006.01)
*G08B 21/18* (2006.01)

(52) U.S. Cl.
CPC .......... *G08B 25/008* (2013.01); *G01J 1/4204* (2013.01); *G08B 21/182* (2013.01)

(58) Field of Classification Search
CPC ............................ G08B 25/008; G08B 21/182
See application file for complete search history.

(56) References Cited

U.S. PATENT DOCUMENTS

| | | | |
|---|---|---|---|
| 6,864,795 B2 | 3/2005 | Smith et al. | |
| 9,606,721 B2 | 3/2017 | Park et al. | |
| 2011/0074558 A1 | 3/2011 | Miura | |
| 2012/0286951 A1* | 11/2012 | Hess | G08B 25/14 340/539.1 |
| 2017/0195953 A1* | 7/2017 | Amorim de Faria Cardote | H04L 67/10 |
| 2018/0082550 A1* | 3/2018 | Read | A61B 5/01 |
| 2018/0355662 A1* | 12/2018 | Hall | G04C 23/50 |

(Continued)

FOREIGN PATENT DOCUMENTS

| | | |
|---|---|---|
| CN | 103501389 A | 1/2014 |
| EP | 2821890 A1 | 1/2015 |
| JP | 05205490 B2 | 6/2013 |

OTHER PUBLICATIONS

Anonymous, "Daylight", https://en.wikipedia.org/wiki/Daylight, Accessed Aug. 2, 2021.

*Primary Examiner* — Ojiako K Nwugo

(57) ABSTRACT

A method for an alarm silencing or suppression routine following activation of a wake-up alarm on an electronic device (42). The method comprises, following the alarm activation, monitoring (14) light levels at a light sensor (44) of the device and automatically silencing (20) or otherwise suppressing the alarm signal responsive to sensing (16) a light level at the sensor above a pre-defined threshold. Following alarm signal suppression, a further confirmatory monitoring period follows in which light levels at the sensor continue to be monitored (22). If they fall to below a further predefined threshold (26), or below the original silencing threshold, the alarm signal is reactivated (28). This ensures that a user has not returned to a darkened environment a short space of time after alarm silencing, which might lead to the user falling back to sleep.

15 Claims, 2 Drawing Sheets

(56) References Cited

U.S. PATENT DOCUMENTS

2019/0318608 A1    10/2019   Rao et al.
2020/0120198 A1     4/2020   Ma et al.

* cited by examiner

WAKE-UP ALARM METHOD

CROSS-REFERENCE TO PRIOR APPLICATIONS

This application claims the benefit of European Patent Application No. 20189423.5, filed on 4 Aug. 2020. This application is hereby incorporated by reference herein.

FIELD OF THE INVENTION

The present invention relates to a method of controlling a wake-up alarm of an electronic device, in particular a method of controlling cessation of the alarm signal after activation.

BACKGROUND OF THE INVENTION

Electronic devices such as personal or mobile computing devices (e.g. smartphones or smart wearable devices) often incorporate wake-up alarm functionality. This allows a user to schedule future alarms to wake them based on certain alarm criteria. Most typically this is time but may also include other factors such as user movement patterns (e.g. to wake up the user during a light sleep phase) or user physiological measurements, e.g. heart rate.

Most wake-up alarm programs include a snooze function, whereby a user can temporarily suppress the alarm signal, e.g. for a defined time period. After the time period elapses, the alarm signal is re-triggered.

During particularly deep sleep phases, a user may snooze or switch off a triggered alarm without fully waking from their sleep state. In many cases, the user may not even remember turning off the alarm. This undermines the alarm functionality, which is intended to bring the user out of a sleep state by means of the alarm signal (e.g. an auditory signal, or another sensory signal such as haptic).

Another limitation of currently available alarms is that a scheduled alarm will typically always trigger, even if a user has already awoken and has left the room containing the alarm device. If a user forgets to disable the alarm before leaving the room, the alarm signal will still trigger at the scheduled time (or at the occurrence of the other alarm criteria). This then causes inconvenience for other members of the household or neighbors as the continuous alarm signal may wake or disturb them.

Developments of wake-up alarm functionality for at least partially overcoming these problems would be of benefit.

SUMMARY OF THE INVENTION

The invention is defined by the claims.

People typically sleep in a dark environment, with window coverings, e.g. curtains, closed. Exposure to light, especially daylight, increases wakefulness. Thus it has been recognized by the inventors that a means for making exposure to light a condition for alarm signal silencing would help ensure a user is fully roused by an alarm.

Thus, according to examples in accordance with an aspect of the invention, there is provided a computer-implemented method for controlling cessation of an alarm signal generated by a wake-up alarm function of an electronic device, the method comprising, following activation of the alarm signal:

monitoring a sensed light input at an optical sensor comprised by the electronic device;

ceasing the alarm signal responsive to detecting occurrence of one or more cessation criteria, the one or more cessation criteria including at least: detecting that a light intensity or illuminance of the light input exceeds a first pre-determined threshold, and/or that an amount of light flux detected since the alarm signal activation exceeds a first pre-determined threshold; and following said cessation of the alarm signal, monitoring the light input at the optical sensor and re-activating the alarm signal dependent upon occurrence of one or more reactivation criteria, the reactivation criteria including at least: detection of a fall in the intensity or illuminance of the light input below a second pre-determined threshold level within a pre-defined time window following the alarm cessation.

Thus, embodiments of the invention provide a wake-up alarm functionality, for implementation by an electronic device, such as a personal computing device, wherein the alarm can only be silenced or suppressed by exposing the device (with an integrated light sensor, such as a lux meter) to a certain amount of light or a certain level of light intensity or illuminance.

For example, when the alarm signal is triggered at the required moment of wake up, the optical sensor in the device may be activated and may measure the environmental light level. When, for example, the measured light intensity at the light sensor exceeds a predefined level, for instance due to the user switching on the room light or opening the curtains, the alarm signal is automatically ceased.

This has two benefits. First, by forcing a user to increase a light level in order to deactivate the alarm signal, it means that, after silencing of the alarm, the user is being exposed to higher light levels which are known to increase wakefulness. This makes it less likely that the user will fall asleep again after silencing the alarm. Second, it has the benefit that if the user wakes before the scheduled alarm time and the alarm activates while the user is out of the room, so long as the user has switched on the room artificial light or opened the curtains before leaving the room, upon triggering of the alarm, the alarm signal will be automatically silenced due to the light level in the room already being sufficiently high.

Embodiments of the present invention also include the further beneficial feature that the alarm will reactivate if light levels fall again within a certain time period after the alarm activation or the alarm silencing. This effectively forces the user to be exposed to the higher light level for pre-determined minimum period of time, further enhancing wakefulness and reducing risk of falling back to sleep. It also avoids for example the user switching on the light once briefly to deactivate the alarm signal and then switching the light back off and returning to sleep.

The alarm signal is for example a sensory signal generated by a sensory output unit. The alarm signal may include one or more of: an acoustic signal, a haptic signal, and an optical signal. The sensory output means may be comprised by the electronic device itself or may be part of an external device, e.g. a haptic feedback unit of a smartwatch device.

The first and second light thresholds may the same or different. The second threshold may be lower than the first in some examples.

In accordance with one or more embodiments, the alarm signal may be reactivated at the end of said pre-defined time window responsive to occurrence of any of said one or more reactivation criteria within said time window.

Here, detection of the reactivation criteria effectively turns the alarm cessation into a snooze period, so that the alarm signal will reactivate at the end of the pre-defined time window (snooze period). Alarm signal reactivation after the time window may require all of the set of one or more reactivation criteria to be met, or may only require a subset of the reactivation criteria to be met.

In accordance with one or more embodiments, following alarm signal cessation, the method may further comprise:

accessing a stored alarm schedule, the alarm schedule recording a schedule of future wake-up alarms; and deactivating any future alarms which are scheduled to trigger within a pre-defined time period following the alarm cessation.

Here, the method automatically disables any future alarms which are due to be triggered in a certain period following alarm silencing or following the activation of the first alarm. This means that once the user has successfully silenced the first alarm (and is awake) subsequent set alarms, e.g. the same morning or same hour, are deactivated. This avoids unnecessary alarms sounding. This deactivation of future alarms may be done in some examples after the initial cessation of the alarm signal, or, alternatively, following the end of said pre-determined time window after alarm silencing, so long as the alarm signal has not been reactivated due to meeting of the reactivation criteria.

In accordance with one or more embodiments, the method may further comprise obtaining information related to local weather, climate and/or light conditions and setting said first pre-determined (light) threshold for cessation of the alarm signal based at least in part on the obtained information. Here, the minimum light level that the device sensor must be exposed to in order to cease the alarm signal is adjusted based on likely local light conditions. For example, if it is cloudy, and it is winter time, the first light threshold may be set lower than if it is sunny and summer time.

The information may be retrieved for example from a remote computer, for example via an internet connection.

In accordance with one or more embodiments, the method may further comprise communicating with one or more external electronic devices, and wherein the cessation criteria further include determining that one or more of said external devices has been activated by a user within a pre-determined time window before and/or after the alarm signal activation.

Hence, here cessation of the alarm signal can be made contingent on the user interacting with one or more devices such as household appliances. These devices may include, by way of non-limiting example, an electric toothbrush, a shaver, a weight scale and/or coffee machine.

For example, the method may comprise receiving signals from one or more external household devices indicative of activation of the relevant devices by a user.

In accordance with one or more embodiments, the optical sensor may be operable to detect spectral properties of the light input, and wherein the cessation criteria include detecting a light input at the optical sensor having a pre-defined set of one or more spectral properties. For example, the cessation criteria may be set so that the sensor must be exposed to natural light to cease the alarm signal. Natural light has a different spectral composition to artificial light. Natural light may promote wakefulness more than artificial light.

In accordance with one or more embodiments, the electronic device may be a personal computing device, e.g. a mobile computing device. For example, the electronic device may be a smartphone, or a smart wearable device such as a smartwatch, or a tablet computer. Any other example personal computing devices are also possible.

Examples in accordance with a further aspect of the invention provide a computer program product comprising computer program code, the computer program code being executable on a processor, wherein, the code is configured to cause the processor to perform a method in accordance with any example or embodiment outlined above or described below, or in accordance with any claim of this application.

Examples in accordance with a further aspect of the invention also provide an electronic device, comprising: an optical sensor; and a controller, adapted to implement a wake-up alarm function on the electronic device. The controller is adapted to, following activation of an alarm signal triggered by the wake-up alarm function:

monitor a sensed light input at the optical sensor;

cease the alarm signal responsive to detecting occurrence of one or more cessation criteria, the one or more cessation criteria including at least: detecting that a light intensity or illuminance of the light input exceeds a first pre-determined threshold, and/or that an amount of light flux detected since the alarm signal activation exceeds a first pre-determined threshold; and following said cessation of the alarm signal, monitor the light input at the optical sensor and re-activate the alarm signal dependent upon occurrence of one or more reactivation criteria, the reactivation criteria including at least: detection of a fall in the intensity or illuminance of the light input below a second pre-determined threshold level within a pre-defined time window following the alarm signal cessation.

The controller may comprise one or more processors, e.g. one or more integrated circuits. The device may further comprise a memory or datastore in some examples which for example may store the first and second thresholds, the length of the pre-defined time window, the cessation criteria and the reactivation criteria.

The wake-up alarm function may comprise triggering activation of the alarm signal responsive to occurrence of one or more alarm activation criteria. The criteria may be time-based for example, or based on other factors such as movement patterns of the user or user physiological signals.

In accordance with one or more embodiments, the alarm signal may be reactivated at the end of said pre-defined time window responsive to occurrence of any of said one or more reactivation criteria within said time window.

In accordance with one or more embodiments, controller may be further adapted to, following alarm cessation:

access a stored alarm schedule, the alarm schedule recording a schedule of future wake-up alarms; and deactivate any future alarms which are scheduled to trigger within a pre-defined time period following the alarm cessation.

In accordance with one or more embodiments, the controller may be further adapted to receive information related to local weather, climate and/or light conditions and to set said first pre-determined light threshold for cessation of the alarm signal based at least in part on the obtained information.

In accordance with one or more embodiments, controller may be further adapted to:

establish a communication channel with one or more external electronic devices, and wherein the cessation criteria further include the controller determining that one or more of said external devices has been activated by a user within a pre-determined time window before and/or after the alarm signal activation.

In accordance with one or more embodiments, electronic device may be a mobile computing device, for example a smartphone.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
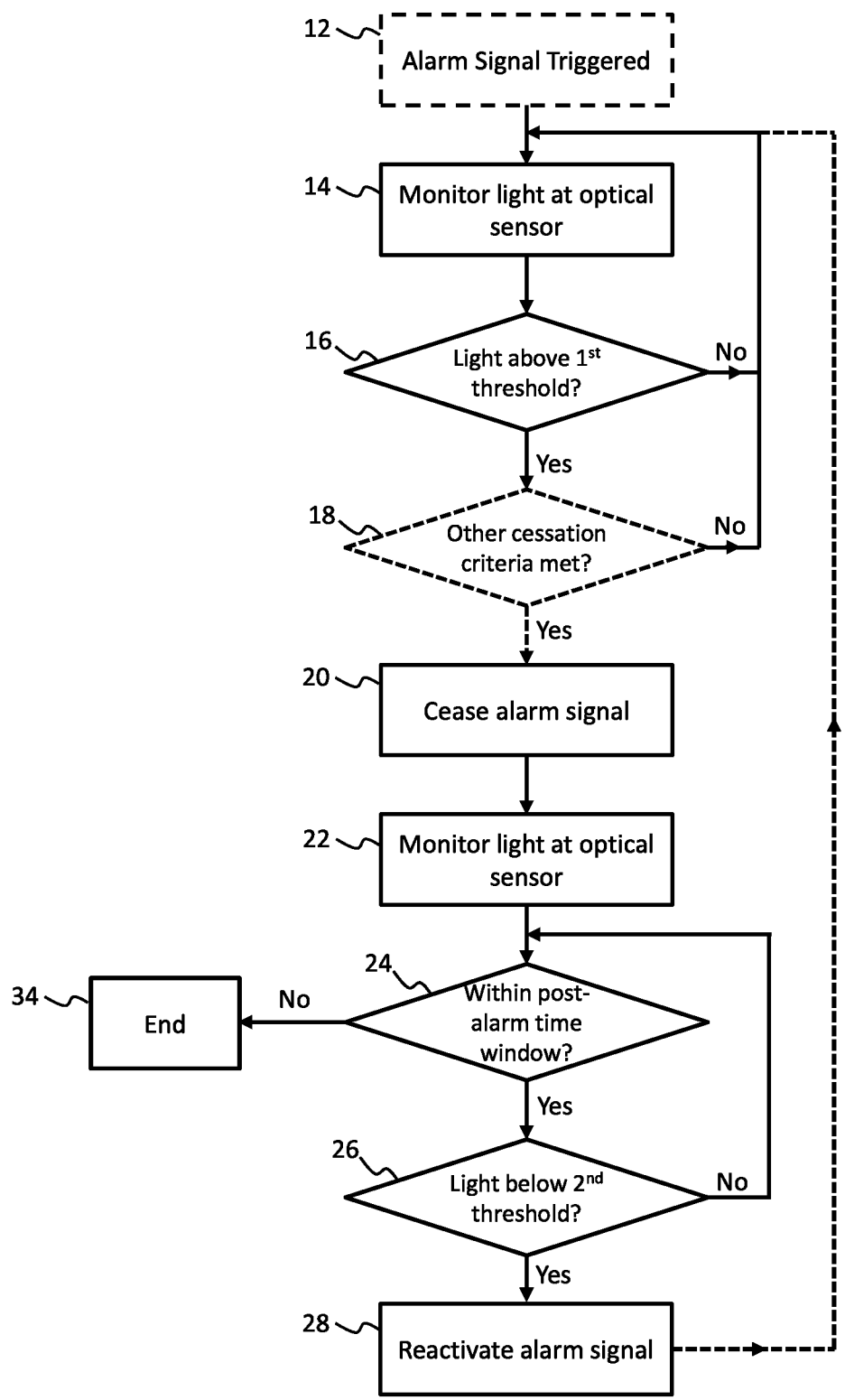
FIG. 1 outlines in block diagram form steps of an example method in accordance with one or more embodiments.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method for an alarm silencing or suppression routine following activation of a wake-up alarm on an electronic device. The method comprises, following the alarm activation, monitoring light levels at a light sensor of the device and automatically silencing or otherwise suppressing the alarm signal responsive to sensing a light level at the sensor above a pre-defined threshold. Following alarm signal suppression, a further confirmatory monitoring period follows in which light levels at the sensor continue to be monitored. If they fall to below a further predefined threshold, or below the original silencing threshold, the alarm signal is reactivated. This ensures that a user has not returned to a darkened environment a short space of time after alarm silencing, which might lead to the user falling back to sleep.

FIG. 1 outlines steps of an example (computer-implemented) method in accordance with one or more embodiments.

The method starts after a wake-up alarm on an electronic device has been triggered 12. This can be due to one or more alarm conditions being met, e.g. a pre-scheduled time being reached, or other criteria such as patient movement patterns. In some examples, the triggering of the alarm signal upon meeting one or more alarm criteria may be included as an additional initial step of the method. In other examples, the method is triggered upon activation of the alarm signal.

Once the wake-up alarm has been triggered 12, the method comprises monitoring 14 a light input at an optical sensor comprised by the electronic device. In some examples, the optical sensor may be activated only responsive to the alarm signal being triggered. A light level detected at the optical sensor is then monitored.

The optical sensor may in some examples be a lux sensor, i.e. an illuminance sensor which measures the illuminance of light received at a light input area of the optical sensor. Illuminance corresponds to the luminous flux per unit area, and is measured in the units of Lux. In further examples, other types of optical sensor may be used which may measure other properties of light or other metrics for light brightness of intensity. In some examples, the optical sensor may be operable to detect a spectral composition of light received at the optical sensor. Various different options for detecting the light level, and optionally spectral properties of the light, will be apparent to the skilled person.

The method further comprises ceasing the alarm signal responsive to detecting occurrence of one or more cessation criteria. For example, the cessation criteria might be stored in a local or remote memory or Datastore, may be consulted or retrieved as part of the method. The method comprises checking whether the cessation criteria have been met.

The one or more cessation criteria include at least detecting that the light input detected at the optical sensor exceeds a first pre-determined light intensity or illuminance threshold, and/or that a first pre-determined threshold of light flux has been detected since the alarm signal activation.

Thus, for example the method comprises a step of determining 16 whether the detected light level is above the threshold, or if the threshold quantity of light has been detected. If not, the method loops back to monitoring the light level. If yes, the method may include a further step of determining 18 if each of any one or more further cessation criteria are met. If not, the method loops back to monitoring the light level. If yes, the method may proceed to a step of ceasing 20, e.g. silencing or suppressing, the alarm signal. Thus, the method remains in a control loop in which is recurrently re-checks the detected light level or amount of light detected, compares it to the pre-determined first threshold and evaluated whether the threshold has been met. There may in some examples be a time-limit on continuance of the loop. For example, the alarm signal automatically ceases after a certain pre-determined time-out time period, which allows for cases in which a user is not in the same location as the phone and cannot deactivate the alarm signal.

The first pre-determined threshold for the light intensity or illuminance or for the amount of detected flux may be stored in a local or remote memory or datastore for example. It may be pre-set or it may be configurable by a user. For example, it might be adjustable by a user when scheduling the alarm to make it harder or easier for the user to cease the alarm signal when the alarm triggers. Any further cessation criteria may also be stored in the local or remote datastore.

In some examples, the first pre-determined threshold for the light illuminance or intensity may be set at a level which is close to or approximates a predicted light illuminance provided by natural daylight. In this way, the user must open the curtains to suppress the alarm signal. In some examples, the first pre-determined threshold for the light illuminance or intensity may be set at a level which matches the light level of the artificial light in the room in which the user sleeps. This threshold might be configurable in advance through a calibration process in which the electrical device prompts the user to expose the optical sensor to the artificial light and then sets the first threshold based on the detected light illuminance or intensity.

In some examples, even if the sensed light level is detected to be above the first threshold value at the time the alarm sounds, $t=t_{alarm}$, the method may still generate the alarm signal for at least a pre-defined period as a failsafe for example against the user falling asleep with the light on or with the curtains open. However, in further examples, this may not be the case, as this then allows for the additional benefit that if the user wakes up before the alarm is triggered and forgets to disable the alarm, the alarm may automatically be suppressed by light in the room, so long as the user turned on a light in the room before leaving or opened the curtains.

In certain advantageous embodiments, the method may further comprise, following said cessation of the alarm signal, monitoring 22 the light input at the optical sensor and re-activating 28 the alarm signal dependent upon occurrence of one or more reactivation criteria. The reactivation criteria may include at least: detection of a fall in the intensity or illuminance of the light input below a second pre-defined threshold level within a pre-defined time window following the alarm cessation (or following the initial triggering of the alarm signal).

The pre-defined time window, $t_{window}$, may be pre-set or may be adjustable by a user in advance. For example, the user may set the time window when scheduling the alarm.

In this set of embodiments, the alarm signal cessation by the user is considered a simply 'snooze' action if, within the time window following alarm silencing, the detected light level falls below a second threshold, where the second threshold could be the same as the first or lower than the first. This would prevent the user from, for example, very quickly toggling on and off the light in the room to disable the alarm and fall back to sleep. The level of the second threshold may be adjustable in advance by a user in some examples.

Thus, for example, following cessation 20 of the alarm signal, the method may comprise starting a timer clock, or recording a start time in a memory. It may retrieve the pre-determined time window duration from a memory. The method may comprise a step of checking 24 whether the pre-determined time window after alarm cessation or after alarm triggering has yet elapsed. This can be done by checking the timer started upon cessation of the alarm signal or comparing the recorded start time with the current time and determining if the time elapsed yet exceeds the pre-determined length for the time window.

If the time window has ended, the method ends 34. For example the alarm is deactivated or disabled.

If the time window has not ended, the method comprises a further step of determining 26 whether the light input at the optical sensor has a level (e.g. illuminance or intensity) which is below the aforementioned second light threshold. If the answer is no, the method loops back again to the step of checking 24 if the time window has yet elapsed. If the light level is below the second threshold, then the method proceeds to reactivating 28 the alarm signal. Optionally the method may then return to the step 14 of monitoring the light level and repeatedly checking whether the detected light exceeds the first threshold. Alternatively, the method may proceed to a separate, different routine.

In accordance with one or more embodiments, the method may comprise receiving information related to local weather, climate, sun rise or set times, time of day, and/or light conditions and setting said first pre-determined light threshold for cessation of the alarm signal based at least in part on the obtained information. This information may for example be retrieved by the electronic device through an internet connection, e.g. based on GPS location information provided by a GPS chip in the electronic device. In this way, the first light threshold may be automatically adapted to the local conditions most likely to affect ambient light levels. For example, the first light threshold may be set to approximately match those light levels. For example, on a sunny day, sunrise is approximately 400 lux. On a cloudy day, it is only approximately 40 lux.

Optionally, following alarm cessation, the method may further comprise: accessing a stored alarm schedule, the alarm schedule recording a schedule of future wake-up alarms; and deactivating any future alarms which are scheduled to trigger within a pre-defined time period following the alarm cessation. For example, all remaining alarms scheduled for the same morning, or scheduled within the following hour or two hours from alarm cessation may be disabled. The alarm schedule may be stored in a local memory of the electronic device for example, or in a remote datastore.

In some examples, the optical sensor may be operable to detect spectral properties of the light input, and wherein the cessation criteria include detecting a light input at the optical sensor having a pre-defined set of one or more spectral properties.

For example, the optical sensor can be used to distinguish between sunlight (natural light) and artificial light (based on light spectrum and/or frequency analysis). The cessation criteria may include that the detected light matches the spectral properties of natural light, or that it matches the spectral properties of artificial light. The cessation criteria may include that the detected light must have specific pre-defined color characteristics (e.g. a defined color balance), for example based on a pre-configured user preference.

In some examples, the cessation criteria may relate to detection of other sensory inputs such as an acoustic input. For example, the electrical device may include an acoustic (e.g. sound) sensor and be adapted to sense sound in the ambient environment. The cessation criteria may include that a certain minimal level (e.g. volume) of sound is detected by the sound sensor, and/or that sound having pre-defined acoustic properties (such as certain frequency composition) is detected. The criteria may be configured so that outdoor light and typical outdoor sounds must be detected for example.

In some examples, the cessation criteria may include detection of one or more pre-defined reference sounds from a sound sensor. The reference sounds may be stored in a local datastore for example, and wherein an acoustic sensor input is processed to determine presence of any of the stored reference sounds. The reference sounds may include sounds associated with wake-up activities of the user, such as running water from a tap, tooth-brushing sounds, running shower sounds, shaver sounds, toilet flushing sounds, or footsteps. The reference sounds may include speech or verbal sounds, e.g. specific words or phrases in the voice of the user, which can be used to check that the user is awake and present at the phone.

In some examples, the cessation criteria may include detection of other environmental parameters such as temperature or air quality. These may be detected by sensors comprised by the electronic device, or by sensors comprised by one or more separate peripheral devices communicatively coupled with the electronic device, e.g. wearable devices. For example, one cessation criterion may include detection of a drop in temperature to below a defined threshold, or a drop by a defined amount, to thereby detect that a user has left their bedroom and is in a colder part of the building. The threshold may be set so that the user must go outside to cease the alarm signal for example.

In accordance with one or more embodiments, the method may be configured to operate in compatibility with a wake-up light alarm clock. A wake-up light alarm clock uses light emitted by a light source to stimulate a user to wake. The light may gradually increase in intensity to a pre-defined maximum intensity. The first threshold light level for ceasing the alarm signal may be set so as to be higher than the maximum light intensity of the wake-up alarm so that the user must add additional light (e.g. by opening the curtains) in order to cease the alarm signal.

Additionally or alternatively, as mentioned above, the optical sensor may be operable to detect spectral properties of the light input. The cessation criteria may require detection of a light input which is of a spectral composition which is different to a known spectral composition of the light of the wake-up light alarm clock. In other words, light which is detected having the spectral composition of the wake-up alarm clock may be discounted from the assessment of whether the first threshold light level has been met. Light of a different spectral composition must be detected at a level above the first threshold, or in an amount above the threshold flux level. The spectral composition of the wake-up alarm clock may be stored in a datastore and used as a reference when assessing the detected light input.

In accordance with one or more embodiments, the cessation criteria may include detecting activation by a user of one or more external electronic devices, e.g. household devices. The method may for example comprise: communicating with one or more external electronic devices. The cessation criteria may include determining that one or more of said external devices has been activated by a user (e.g. by triggering an activation event on the device) within a pre-determined time window before and/or after the alarm signal activation. The length of the time window may be configurable by a user.

The external devices may be appliances in the same house which have functionality for communicating to the electronic device when that they have been activated by a user. Thus, if the user has already woken and is starting a morning routine, the relevant activated devices transmit signals to the electronic device to indicate that they have been activated. If the user is awoken by the alarm signal of the electronic device, it may be necessary to switch on one or more devices before the alarm signal can be ceased, e.g. an electric toothbrush.

Examples of suitable external devices include an electric toothbrush, a weight scale, electric shaver, or a coffee machine. Where the devices are health or hygiene related devices, e.g. a weight scale or toothbrush, a secondary benefit is achieved, as regular use of these devices is promoted.

Various other cessation criteria may also be considered. By way of example, suitable cessation criteria may include one or more of the following.

One or more actions performed on the electronic device by the user, e.g. specific apps being opened, specific actions within certain apps, certain phone movements (e.g. detectable by the phone accelerometer).

Facial recognition of the user using a native camera of the electronic device. A particular facial expression may be required, e.g. indicating wakefulness. This might for example require open eyes and/or a minimum pupil size.

Criteria related to sensor outputs from sensors included in one or more peripheral devices, such as smart wearable devices, in/on-ear speakers, or smart glasses. The criteria may relate to detecting physical activity of the user, e.g. detecting one or more steps of the user to check that it is the user themselves who has got up and turned on the light, or e.g. detecting a threshold number of steps or other physical activity. The criteria may also include certain threshold levels for one or more physiological parameters for the user.

Pre-defined inputs from one or more sensors included in wearable devices connected to the electronic device, such as a smart watch or earbuds. The sensors could include sound sensors and/or activity sensors. The criteria may be set for detecting that it is the user him or herself that is undertaking the action of switching on the light or opening the curtains (rather than e.g. a partner or someone else in the room).

Inputs from a bed occupancy sensor for detecting bed exit.

As discussed, reactivation of the alarm signal may additionally require, or be additionally triggered by, further reactivation criteria.

In accordance with one or more embodiments, the reactivation criteria may include absence of interaction with the electronic device for a pre-defined period of time, i.e. detection of a pre-defined minimum idle time. The period of time may be the same as the pre-defined time window following the alarm cessation during in which a fall in the light is to be detected in order to trigger reactivation.

For example, the electronic device may be a mobile computing device such as a smartphone, and absence of interaction means absence of any interaction with a touch-screen display or with any of the buttons. Reactivation of the alarm may require occurrence of both the fall in the light level discussed previously, and the pre-defined electronic device idle time. If the user is interacting with their electronic device, it indicates that they are awake and thus this signal can safely override the fact that the light level has fallen.

In accordance with one or more embodiments, the reactivation criteria may include detection of one or more acoustic signals, e.g. sounds. These may be detected by a local acoustic or sound sensor of the electronic device for example. The sounds may include non-verbal user sounds associated with sleeping, e.g. certain defined patterns of breathing or snoring. Pre-defined reference sounds for detection may be stored in a local datastore of the electronic device for example. The reactivation criteria may include detection of the reference sounds. This may be required in addition to the detection of the fall in the light level to below said second pre-defined threshold, or in some examples, detection of any of the reactivation criteria may be sufficient for reactivation of the alarm signal, where this may be the fall in the light level, or any of the other reactivation criteria (in cases where there are further reactivation criteria).

Examples in accordance with a further aspect of the invention provide a computer program product comprising computer program code, the computer program code being executable on a processor, wherein, the code is configured to cause the processor to perform a method in accordance with any example or embodiment outlined above or described below, or in accordance with any claim of this application.

A further aspect of the invention provides an electronic device having the wake-up alarm functionality and having the optical sensor.

Figure 2:
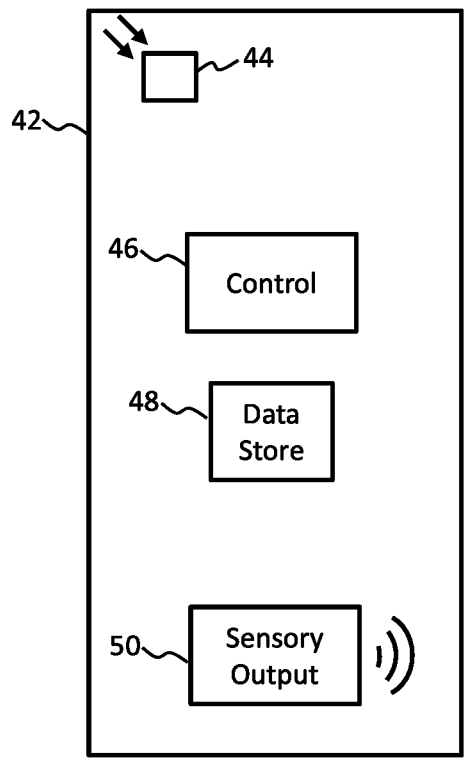
FIG. 2 schematically illustrates an example electronic device according to one or more embodiments.

Thus, FIG. 2 schematically illustrates components of an example electronic device 42 according to one or more embodiments. The device may be a personal computing device such as a smartphone or smart wearable device. FIG. 2 is merely schematic and the shape or configuration of the device and the components may differ from that shown.

The device 42 comprises an optical sensor 44. The optical sensor may for example be a Lux sensor.

The device further comprises a controller 46, adapted to implement a wake-up alarm function on the electronic device.

The controller 46 is adapted to, following activation of an alarm signal triggered by the wake-up alarm function, perform the following:

monitor a sensed light input at the optical sensor;

cease the alarm signal responsive to detecting occurrence of one or more cessation criteria, the one or more cessation criteria including at least: detecting that the light input exceeds a pre-determined first light intensity or illuminance threshold, and/or that a pre-determined minimum quantity of light flux has been detected since the alarm signal activation, and following said cessation of the alarm signal, monitor the light input at the optical sensor and re-activate the alarm signal dependent upon occurrence of one or more reactivation criteria, the reactivation criteria including at least: detection of a fall in the intensity or illuminance of the light input below a second pre-defined threshold level within a pre-defined time window following the alarm signal cessation.

The device 42 may include a local datastore 48, such as a memory chip, for storing the first and second light thresholds, in addition to any further cessation criteria and/or reactivation criteria. The datastore may also store the length of the pre-defined time window following alarm signal cessation.

The device 42 may further include a sensory output unit 50 for generating the alarm signal in the form of a sensory output. The sensory output may be configured to generate any kind of sensory output, for example acoustic and/or haptic (e.g. vibration). Additionally or alternatively, the alarm signal may be generated by an external device, e.g. a wearable device worn by the user such as a smart watch. A wearable device may vibrate to wake the user for example. The device may further comprise a communication interface for communicating with an external device which incorporates the sensory output unit within it. Upon triggering of the alarm, the controller may use the communication module to communicate with the external device to instruct it to activate the alarm signal.

The wake-up alarm function comprises triggering activation of the alarm signal responsive to occurrence of one or more alarm activation criteria. The activation criteria may be a certain pre-determined time being reached, or may include certain activity patterns of the user or physiological signals of the user.

Figure 3:
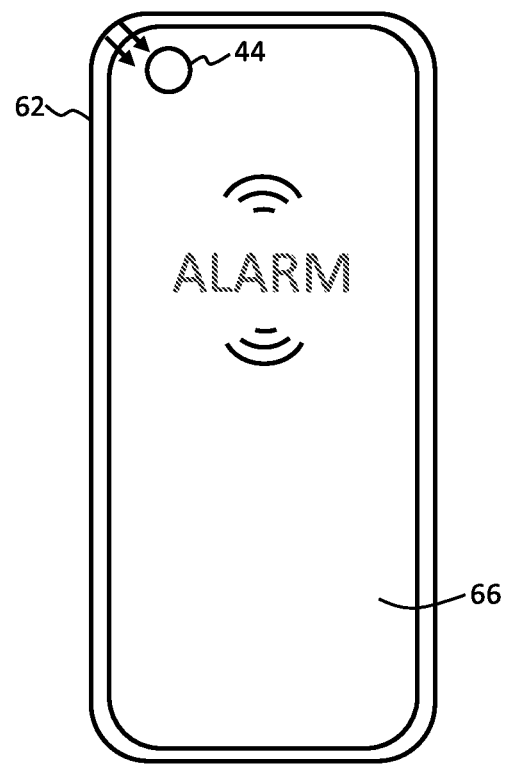
FIG. 3 shows an example device according to one or more embodiments.

In accordance with one or more embodiments, the electronic device 42 may be a smartphone device 62, as illustrated in FIG. 3. The smartphone device comprises a touchscreen display 66 which acts as a user interface, permitting the user to configure settings of the wake-up alarm function such as the alarm activation criteria, the alarm cessation criteria, the alarm reactivation criteria and any other settings of the alarm functionality. The optical sensor may be provided by a local light sensor of the smartphone. For example, most smartphones include a light level sensor for use in determining light levels to adjust the screen brightness for a given user environment, and for determining proximity of the phone to a user's body. In further examples, the phone camera itself could be used as the optical sensor.

As mentioned above, according to certain embodiments, the controller 46 of the electronic device may be configured to: establish a communication channel with one or more external electronic devices, and wherein the cessation criteria further include the controller determining that one or more of said external devices has been activated by a user within a pre-determined time window before and/or after the alarm signal activation. For example, the cessation criteria may include the controller determining that a user has triggered an activation event on one or more of said external devices within a pre-determined time window before and/or after the alarm signal activation.

The device 42 may include a communication interface for communicating with said external devices. The communication channel may be a wireless communication channel, for example via Wi-Fi, internet, Bluetooth, ZigBee or any other wireless communication protocol.

Figure 4:
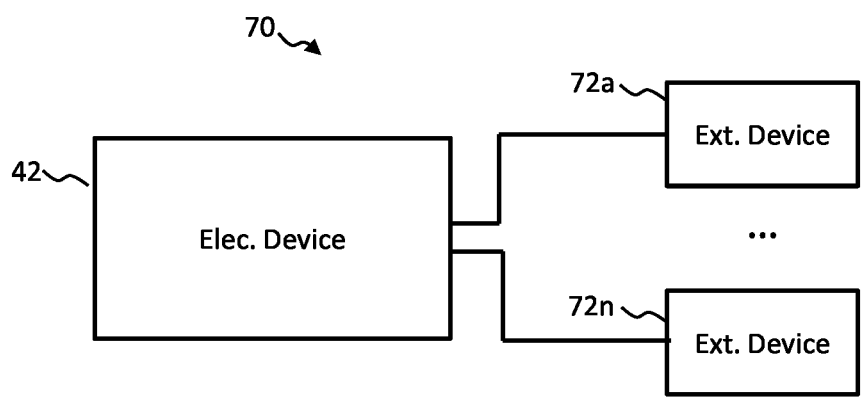
FIG. 4 illustrates communication with external devices for informing cessation of an alarm signal.

In accordance with a further aspect of the invention, there may be provided a system comprising an electronic device 42 is accordance with any example or embodiment outlined above or described below, or in accordance with any claim of this application, and further comprising a set of one or more external devices communicatively coupled with the electronic device. FIG. 4 shows an example system 70 which includes n external devices 72a-72n communicatively coupled with the electronic device. The external devices may, by non-limiting example, include one or more of: a coffee machine, an electric kettle, a bathroom scale, an electric toothbrush, an electric shower, and a shaver. The electronic devices 72 may each be configured to transmit a signal to the electronic device 42 when they are activated by a user.

The communication between the electronic device 42 and the external device 72 may be via a local area network (e.g. through a Wi-Fi link) or through an internet connection, or through another communication medium such as Bluetooth.

As discussed above, embodiments make use of a controller. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A computer-implemented method for controlling cessation of an alarm signal generated by a wake-up alarm function of an electronic device, the method comprising, following activation of the alarm signal:
    monitoring a sensed light input at an optical sensor comprised by the electronic device;
    ceasing the alarm signal responsive to detecting occurrence of one or more cessation criteria, the one or more cessation criteria including at least: detecting that a light intensity or illuminance of the light input exceeds a first pre-determined threshold, and/or that an amount of light flux detected since the alarm signal activation exceeds a first pre-determined threshold; and
    following said cessation of the alarm signal, monitoring the light input at the optical sensor and re-activating the alarm signal dependent upon occurrence of one or more reactivation criteria, the reactivation criteria including at least: detection of a fall in the intensity or illuminance of the light input below a second pre-determined threshold within a pre-defined time window following the alarm cessation.

2. The method of claim 1, wherein said alarm signal is reactivated at the end of said pre-defined time window responsive to occurrence of any of said one or more reactivation criteria within said time window.

3. The method of claim 1, wherein, following alarm cessation, the method further comprises:
    accessing a stored alarm schedule, the alarm schedule recording a schedule of future wake-up alarms; and
    deactivating any future alarms which are scheduled to trigger within a pre-defined time period following the alarm cessation.

4. The method of claim 1, wherein the method further comprises receiving information related to local weather, climate and/or light conditions and setting said first pre-determined light threshold for cessation of the alarm signal based at least in part on the obtained information.

5. The method of claim 1, wherein the method further comprises:
    communicating with one or more external electronic devices; and
    wherein the cessation criteria further include determining that one or more of said external devices has been activated by a user within a pre-determined time window before and/or after the alarm signal activation.

6. The method of claim 1, wherein the optical sensor is operable to detect spectral properties of the light input, and wherein the cessation criteria include detecting a light input at the optical sensor having a pre-defined set of one or more spectral properties.

7. The method of claim 1, wherein the electronic device is a mobile computing device, and optionally wherein the electronic device is a smartphone or tablet computer.

8. The computer program product comprising computer program code, the computer program code being executable on a processor, wherein, the code is configured to cause the processor to perform a method in accordance with claim 1.

9. An electronic device, comprising:
    an optical sensor; and
    a controller, adapted to implement a wake-up alarm function on the electronic device, and wherein the controller is adapted to, following activation of an alarm signal triggered by the wake-up alarm function:
        monitor a sensed light input at the optical sensor;
        cease the alarm signal responsive to detecting occurrence of one or more cessation criteria, the one or more cessation criteria including at least: detecting that a light intensity or illuminance of the light input exceeds a first pre-determined threshold, and/or that an amount of light flux detected since the alarm signal activation exceeds a first pre-determined threshold, and
        following said cessation of the alarm signal, monitor the light input at the optical sensor and re-activate the alarm signal dependent upon occurrence of one or more reactivation criteria, the reactivation criteria including at least: detection of a fall in the intensity or illuminance of the light input below a second pre-determined threshold within a pre-defined time window following the alarm signal cessation.

10. The device of claim 9, wherein the wake-up alarm function comprises triggering activation of the alarm signal responsive to occurrence of one or more alarm activation criteria.

11. The device of claim 9, wherein said alarm signal is reactivated at the end of said pre-defined time window responsive to occurrence of any of said one or more reactivation criteria within said time window.

12. The device of claim 1, wherein the controller is further adapted to, following alarm cessation:
    access a stored alarm schedule, the alarm schedule recording a schedule of future wake-up alarms; and
    deactivate any future alarms which are scheduled to trigger within a pre-defined time period following the alarm cessation.

13. The device of claim 9, wherein the controller is further adapted to receive information related to local weather, climate and/or light conditions and to set said first pre-determined light threshold for cessation of the alarm signal based at least in part on the received information.

14. The device of claim 9, wherein the controller is further adapted to:
    establish a communication channel with one or more external electronic devices, and
    wherein the cessation criteria further include the controller determining that one or more of said external devices has been activated by a user within a pre-determined time window before and/or after the alarm signal activation.

15. The device of claim 1, wherein the electronic device is a mobile computing device, for example a smartphone.

* * * * *